Oct. 17, 1967
R. G. KNUDSEN ETAL
3,347,075
TUBULAR WALL RIDGE REMOVING AND EXPANDING
DEVICES OF THE PORTABLE TYPE
Filed Dec. 9, 1963
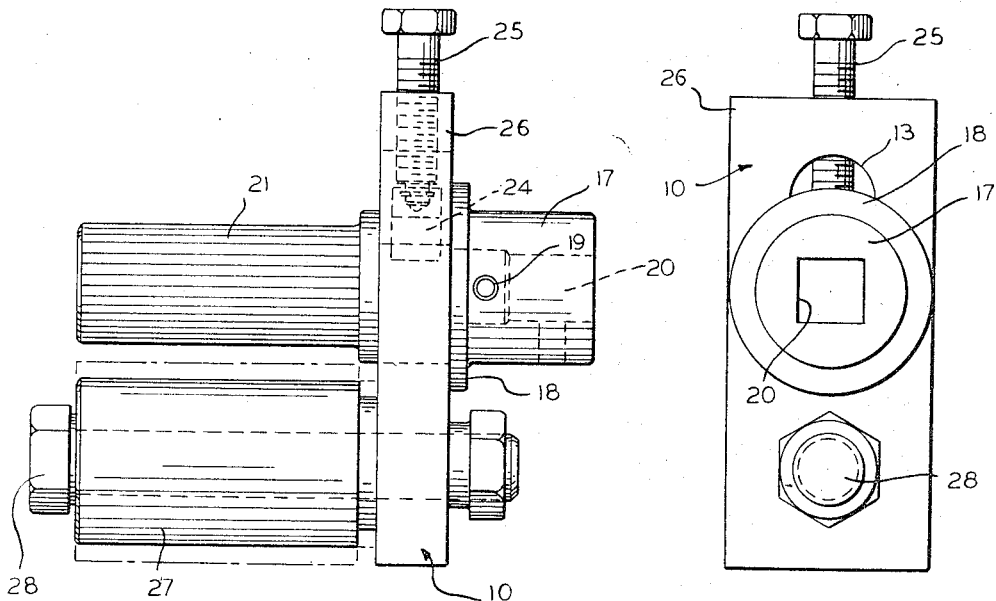
FIG. 1
FIG. 2
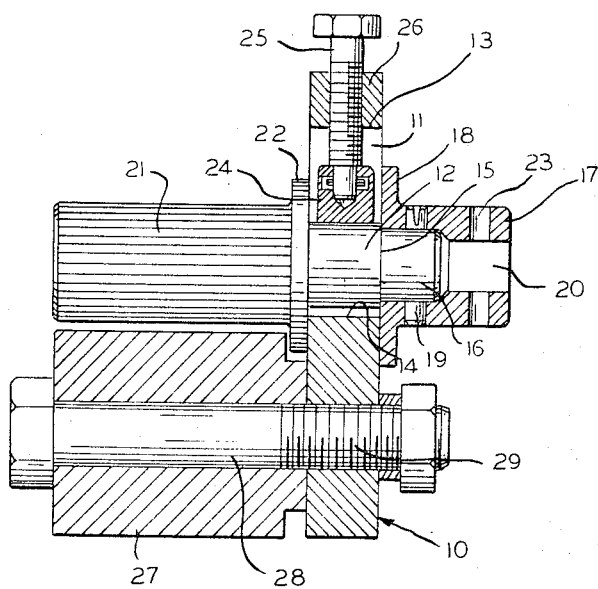
FIG. 3
INVENTORS
RAYMOND G. KNUDSEN
ROBERT E. BADGER
BY RAYMOND R. ZUZINEC
ATTORNEY 3,347,075
TUBULAR WALL RIDGE REMOVING AND EXPANDING DEVICES OF THE PORTABLE TYPE
Raymond G. Knudsen, Robert E. Badger, and Raymond R. Zuzinec, Kenosha, Wis., assignors to Snap-On Tools Corporation, Kenosha, Wis., a corporation of Delaware
Filed Dec. 9, 1963, Ser. No. 329,040
7 Claims. (Cl. 72—111)

This invention relates to a tail pipe ridge expander tool and more particularly to a portable pipe or sleeve end reforming device, although the teachings thereof may be employed with equal advantage for other purposes.

It contemplates more especially the provision of a portable roller pressure reactor device that can be inserted within a pipe or sleeve end for expanding the interior and reforming the outline thereof to render such receptive to new fittings and extensions thereof, such as but not limited to the installation of new mufflers and tail pipes on automobile engines and the like.

The replacement of engine pipes, automobile exhaust mufflers, and tail pipes connected thereto, present problems in deformation over the normal life span thereof because these are usually held together by straps or clamps which sooner or later create a ridge or circular depression in the interfitting pipes or sleeves due to the high heat attendant with such operation. Thereafter, when one or the other of these automobile exhaust pipe systems require parts thereof to be replaced such as the tail pipe without the muffler or vice versa, it is difficult to find easily interfitting parts and at times the entire system requires dismantling on that account.

With the teachings of the present invention, a portable ridge expander device can be inserted into the remaining pipe or sleeve and the ridge or circular depression rolled out and expanded to provide for an easy fit for the complemental pipe or muffler that is to be replaced and connected therewith. This eliminates the necessity of removing the part of the system that is to remain, and much time and expense is thus eliminated by merely applying the device embodying teachings of the present invention and rolling out the ridge or circular depression caused by the clamping together of interfitting parts and the use thereof under high temperatures created by the exhaust gases.

One object of the present invention is to simplify and improve pipe or sleeve expanding devices for use without requiring the removal of any part of the exhaust system that is to be retained.

Another object is to provide an improved pipe ridge expander that is simple, lightweight, and readily applicable to a pipe or sleeve without dismantling any part thereof to which a new extension is to be applied.

Still another object is to provide a pipe expander set of rollers with a relatively adjustable mount for applying variable pressure to the rolling operation thereof for eliminating ridges and other deformations in existing parts of a pipe system without removal of the sections to be retained.

A further object is to provide a highly portable and easily insertable pair of rollers in relation to a pipe section to reform the interfitting end region thereof in order to establish a connection with a new section for replacement purposes.

A still further object is to provide an improved adjustable mount for confronting rollers so that one may be rotated relative to another to expand the end regions of pipes or sleeves that have become deformed during use and to render such interfitting with a new section to be connected therewith.

Other objects and advantages will appear from the following description of an illustrated preferred embodiment of the invention.

In the drawing:

FIGURE 1 is a front view in elevation of a device embodying features of the present invention.

FIGURE 2 is an end view in elevation of the device shown in FIGURE 1.

FIGURE 3 is a sectional view in elevation taken substantially along line III—III of FIGURE 2.

The structure selected for illustration is not intended to serve as a limitation upon the scope or teachings of the invention, but is merely illustrative thereof. There may be considerable variations and adaptations of all or part of the teachings depending upon the dictates of commercial practice. The present invention comprises a substantially rectangular portable body member 10 which is provided with an elongated opening or slot 11 therein to receive a bearing 12 sized in diameter to correspond with the width of the slot 11 for rotation therein and for displacement along the length thereof. To this end, the slot 11 terminates in semi-circular ends 13–14 which are complemental to the curvature and size of the bearing 12.

The bearing 12 has a peripheral shoulder 15 defined by a reduced stub 16 to which is attached an adapter sleeve 17 having an enlarged flange 18 bearing against or having physical contact with one side of the body member 10. A suitable pin or set screw 19 detachably mounts and retains the adapter sleeve 17 on the stub 16 to present a geometrical opening 20 in the free end thereof, in this instance an opening 20 of square cross-section. Any standard ratchet wrench with a complemental drive shaft can be fitted into the sleeve opening 20 to rotate the bearing 12 relative to the body member 10. The bearing 12 has a knurled roller 21 provided with an enlarged peripheral flange 22 formed integral therewith to rotate responsive to applying a ratcheting rotary action to the adapter 17 which may be provided with a diametrically extending aperture 23 therethrough that is interrupted by the drive opening 20. The aperture 23 may be utilized to depress a standard and well known lock-on detent (not shown) with which the ratchet wrench drive shaft may be fitted in accordance with standard practice. This can be accomplished with a nail-set or any small diameter pin such as an ordinary nail (not shown).

The bearing 15 is positioned in the slot 11 by means of a complementally curved bearing block 24 swivelled to an adjusting stud 25 that threadedly engages the upper reach 26 of the body member 10 to adjustably retain the bearing block 24 at a predetermined position in and along the slot 11. A confronting smooth surfaced cylindrical idler driven roller 27 of somewhat larger diameter than the knurled drive roller 21, is mounted on a stud 28 threaded as at 29 to engage the body member 10 for anchored mounting of the idler driven roller 27 in rigid parallel confronting relation to the driver roller 21 to engage the inner surface of an open muffler or exhaust pipe end or other pipe or sleeve to expand the end thereof and remove any deformation thereto so as to perfectly fit a pipe or hollow flange stub on a muffler or tail pipe end or otherwise to interfit a new section therewith to enable connection thereto without removal of the old part that is to be retained. The extent of the expanded reformation and the thickness of the pipe, sleeve or hollow stub flange is accounted for by adjusting the stud 25 which also controls the extent of roller reacting pressure during the rotation of the adapter sleeve 17 responsive to the ratcheting rotation thereof. Any standard power drive or ratchet wrench usually in the possession of automobile and other mechanics is inserted into the drive opening 20 of the adapter 17 to accomplish this rolling action and consequent deformation of the sleeve, pipe or stub flange end.

While we have illustrated and described a preferred embodiment of the invention, it must be understood that the invention is capable of considerable variation and modification without departing from the spirit of the invention. We, therefore, do not wish to be limited to the precise details of the construction set forth, but desire to avail ourselves of such variations and modifications as come within the scope of the appended claims.

We claim:

1. In a device of the character described, the combination with a portable frame member adapted to be held manually for insertion and positioning relative to a tubular pipe or stub flange end, of a pair of rollers journalled on said frame member, one of said rollers being a driver and the other a driven roller in spaced relation to receive the wall of a circumferential stub flange or pipe end therebetween, bearings in said frame for the journalled support of each of said rollers, one of said bearings being slidably adjustable in said frame member, adjustable means in said frame member for operative connection with said slidable bearing, said rollers being journalled in said frame at only one end thereof to present a freely accessible other end for the reception of a pipe therebetween with said frame member serving as a manual grasp for insertion of said rollers and for the rotation thereof, and means for enabling the driver roller to be rotated and the driven roller to follow in frictional operative engagement with the wall of a pipe or flange therebetween, whereby continued rotation of the driver roller with the driven roller in frictional contact therewith through the wall end disposed therebetween will expand the pipe or flange end and remove any ridges therein to enable a telescopic fit with a new section of pipe or the like.

2. A device defined in claim 1 wherein the driver roller is adjustably mounted in said body member relative to said fixedly driven roller.

3. A device of the type defined in claim 2 wherein the driver roller is provided with a pipe insertion limiting peripheral and circumferential shoulder to serve as a guide around the pipe to be rolled.

4. A device of the character defined in claim 3 wherein the driver is provided with a split bearing in said frame member to enable the spacing adjustment thereof relative to the driven roller.

5. A device of the character defined in claim 4 wherein the split bearing has one portion thereof swivelly connected to a threaded adjusting stud that is in threaded engagement with the body member to effect the spacing of the rollers and to apply variable pressure during the rolling operation.

6. In a device for removing the ridge in pipes and the like which consists of a portable frame member adapted to be held in a bench vise, a pair of confronting rollers journalled in said frame member, one of said rollers being journalled in a displaceable bearing carried by said frame, means for adjustably positioning said displaceable bearing along said frame to carry the roller to and fro relative to the other confronting roller to vary the reactive pressure therebetween, said adjustable means serving to retain said displaceable bearing in any predetermined position of adjustment.

7. A device of the character defined in claim 6 including a circumferential flange on one of said rollers and a complemental circumferential groove in the other of said rollers for abutting rotation with a pipe end therebetween as said rollers turn thereon relative to each other.

References Cited

UNITED STATES PATENTS

| 478,670 | 7/1892 | Welch | 72—124 |
| 818,620 | 4/1906 | Grossman | 72—111 |
| 2,131,027 | 9/1938 | French et al. | 113—120 |
| 2,453,126 | 11/1948 | Forcier | 72—124 |
| 2,888,847 | 6/1959 | Younkin | 72—111 |

RICHARD J. HERBST, *Primary Examiner.*